US011650224B2

(12) United States Patent
Sadeghian Marnani et al.

(10) Patent No.: US 11,650,224 B2
(45) Date of Patent: *May 16, 2023

(54) METHOD OF POSITIONING A CARRIER ON A FLAT SURFACE, AND ASSEMBLY OF A CARRIER AND A POSITIONING MEMBER

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Jasper Winters, 's-Gravenhage (NL); William Edward Crowcombe, 's-Gravenhage (NL); Teunis Cornelis van den Dool, 's-Gravenhage (NL); Geerten Frans Ijsbrand Kramer, 's-Gravenhage (NL); Albert Dekker, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 621 days.

This patent is subject to a terminal disclaimer.

(21) Appl. No.: 16/683,787

(22) Filed: Nov. 14, 2019

(65) Prior Publication Data
US 2020/0081034 A1 Mar. 12, 2020

Related U.S. Application Data

(63) Continuation of application No. 15/322,823, filed as application No. PCT/NL2015/050488 on Jul. 3, 2015, now Pat. No. 10,495,667.

(30) Foreign Application Priority Data
Jul. 4, 2014 (EP) .................................. 14175819

(51) Int. Cl.
G01Q 70/02 (2010.01)
F16M 7/00 (2006.01)
F16M 11/18 (2006.01)
F16M 11/04 (2006.01)
F16M 11/20 (2006.01)
F16M 11/24 (2006.01)

(52) U.S. Cl.
CPC .............. *G01Q 70/02* (2013.01); *F16M 7/00* (2013.01); *F16M 11/043* (2013.01);
(Continued)

(58) Field of Classification Search
CPC ........ G01Q 70/02; F16M 7/00; F16M 11/043; F16M 11/18; F16M 11/2085; F16M 11/2092; F16M 11/24; F16M 2200/08
(Continued)

(56) References Cited

U.S. PATENT DOCUMENTS 4,390,172 A * 6/1983 Gotman ............... F16M 11/041
29/559
4,633,810 A 1/1987 Martin
(Continued)

FOREIGN PATENT DOCUMENTS

DE 3829022 A1 3/1989
DE 102012108707 A1 5/2014
(Continued)

OTHER PUBLICATIONS

Giesen, Peter, and Erik Folgering. "Design guidelines for thermal stability in optomechanical instruments." Optical Science and Technology, SPIE's 48th Annual Meeting. International Society for Optics and Photonics, Oct. 2003, pp. 126-134.

*Primary Examiner* — Muhammad Ijaz
(74) *Attorney, Agent, or Firm* — Hoffmann and Baron, LLP; Anthony Bennett

(57) ABSTRACT

The invention is directed at a method of positioning a carrier on a flat surface using an positioning member, wherein the
(Continued)

carrier comprises an upper part and a base which are connected to each other such as to be arranged remote from each other, wherein the positioning member is arranged between the base and the upper part such that the base is located at an opposite side of the positioning member with respect to the upper part of the carrier, the upper part resting on the positioning member prior to placing of the carrier onto the flat surface, wherein the upper part comprises three engagement elements, and wherein the positioning member comprises a support surface for receiving the three engagement elements of the upper part, said support surface including a plurality of sockets forming a kinematic mount for said three engagement elements, wherein the base comprises three landing elements, each landing element being associated with a respective one of the three engagement elements, and the method comprising the steps of: operating the positioning member for moving the carrier relative to the flat surface in a direction parallel thereto such as to position the carrier above a landing position; performing an action of placing the carrier on the flat surface at the landing position, said action of placing comprising: moving the base towards the flat surface until at least one of said landing elements is in contact with the flat surface and an associated engagement element of said engagement elements is released from the kinematic mount; continue said moving of the base relative to the flat surface until all landing elements are in contact with the flat surface; and continue said action of placing the carrier until all engagement elements are released from the kinematic mount.

7 Claims, 8 Drawing Sheets

(52) U.S. Cl.
CPC ......... *F16M 11/18* (2013.01); *F16M 11/2085* (2013.01); *F16M 11/2092* (2013.01); *F16M 11/24* (2013.01); *F16M 2200/08* (2013.01)

(58) Field of Classification Search
USPC .......................................................... 269/309
See application file for complete search history.

(56) References Cited

U.S. PATENT DOCUMENTS

| | | | | |
|---|---|---|---|---|
| 5,115,549 | A * | 5/1992 | Maruyama | B23Q 1/545 269/309 |
| 5,323,712 | A * | 6/1994 | Kikuiri | F16M 11/123 108/138 |
| 5,346,317 | A * | 9/1994 | Williams | F16C 19/10 384/617 |
| 5,376,790 | A * | 12/1994 | Linker | G02B 21/002 977/851 |
| 10,067,158 | B2 * | 9/2018 | Sadeghian Marnani | G01Q 70/02 |
| 10,495,667 | B2 * | 12/2019 | Sadeghian Marnani | F16M 11/043 |
| 2015/0369419 | A1 | 12/2015 | Nishikawa | |
| 2017/0131323 | A1 * | 5/2017 | Sadeghian Marnani | G01Q 10/04 |

FOREIGN PATENT DOCUMENTS

| | | |
|---|---|---|
| EP | 2682759 A1 | 1/2014 |
| WO | 2007121208 A2 | 10/2007 |

* cited by examiner

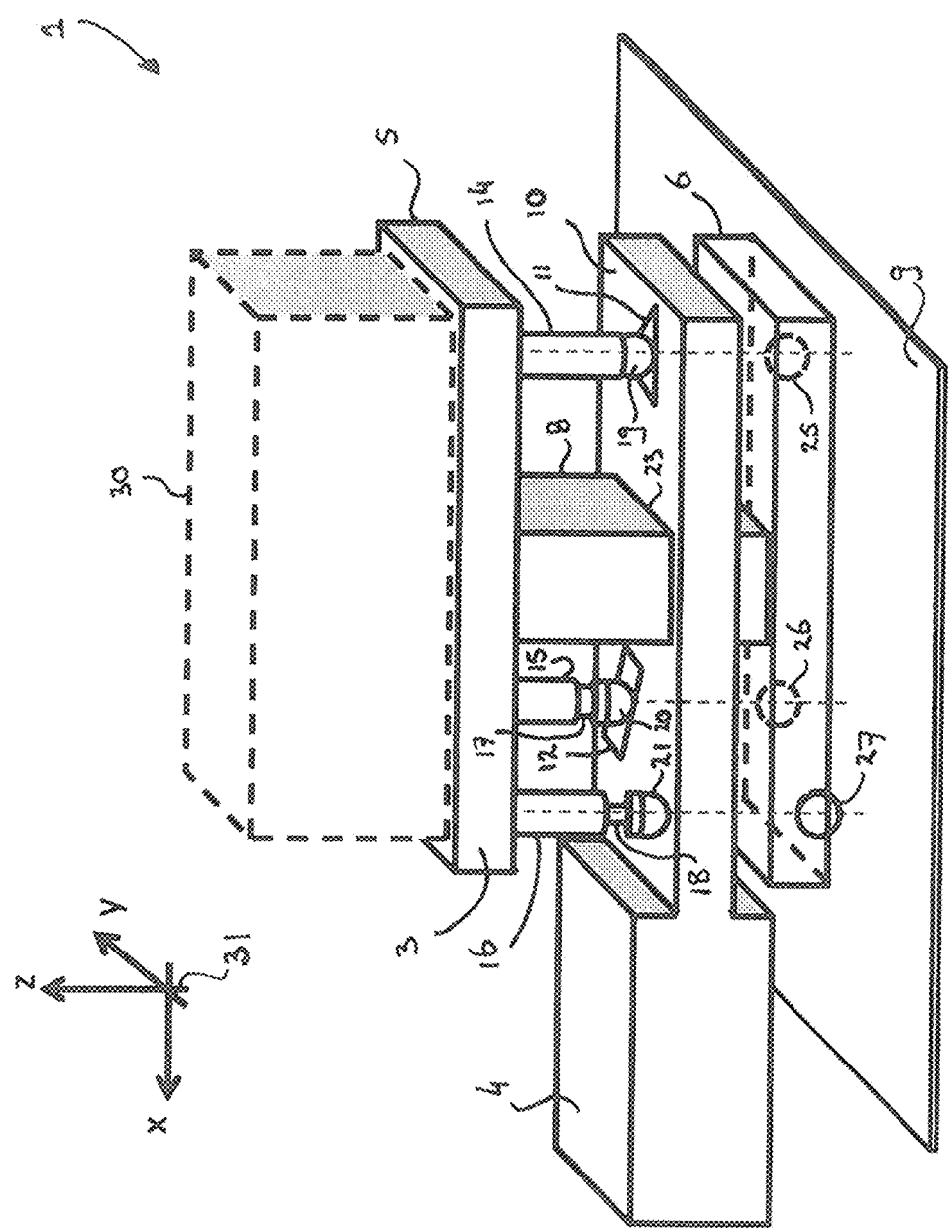

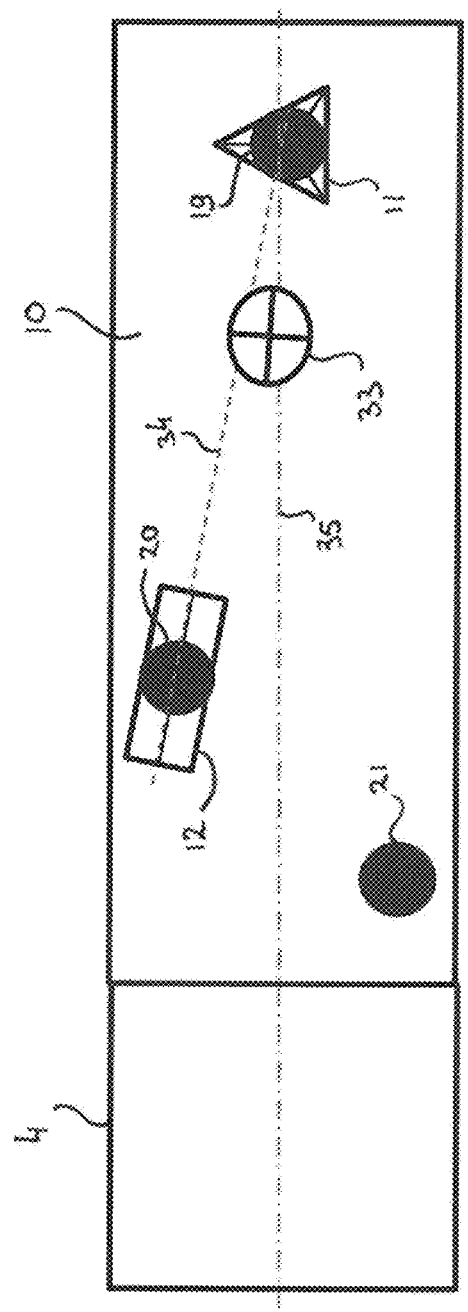

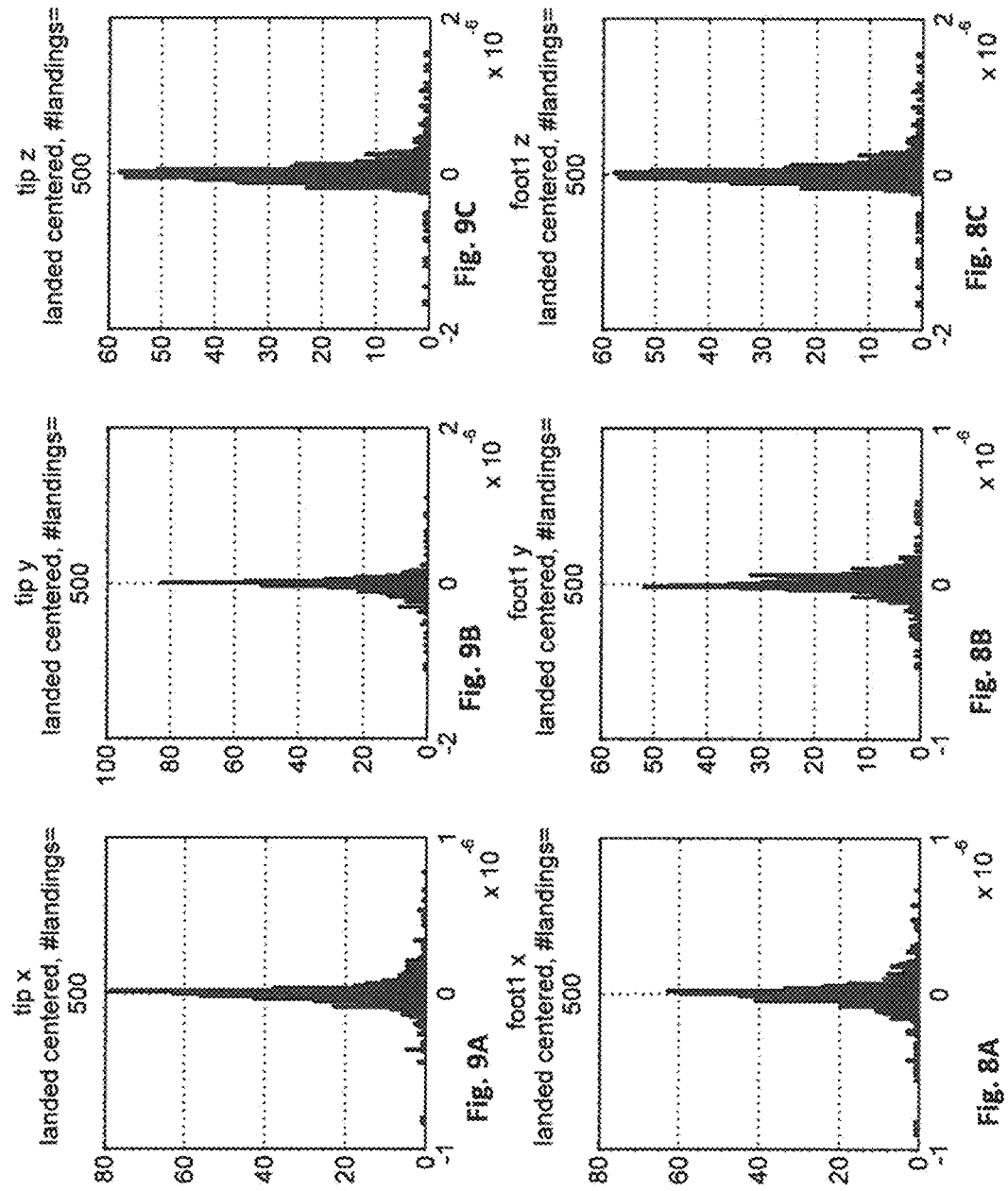

METHOD OF POSITIONING A CARRIER ON A FLAT SURFACE, AND ASSEMBLY OF A CARRIER AND A POSITIONING MEMBER

CROSS-REFERENCE TO RELATED APPLICATIONS

This application is a continuation of U.S. application Ser. No. 15/322,823, filed Dec. 29, 2016, which is a U.S. National Phase of, and Applicant claims priority from, International Patent Application Number PCT/NL2015/050488, filed Jul. 3, 2015, which claims priority from EP 14175819.3, filed Jul. 4, 2014, each of the aforementioned applications incorporated by reference herein.

FIELD OF THE INVENTION

The present invention is directed at a method of positioning a carrier on a flat surface using a positioning member. The invention is further directed at an assembly of a carrier and a positioning member, said assembly being arranged for positioning the carrier on a flat surface using the positioning member, wherein the positioning member is arranged for moving the carrier relative to the flat surface in a direction parallel thereto such as to enable positioning of the carrier above a landing position. Moreover, the invention is directed at a carrier, and further at an positioning member for use in an assembly in accordance with the invention.

BACKGROUND

Many different types of placing mechanisms are applied for performing all kinds of tasks, for example in pick-and-place arrangements. Such placing mechanisms in most cases allow for a certain level of inaccuracy that can be managed during placing or which is self correcting. For some applications, however, a very high level of accuracy may be required, such as to enable placing of an object highly accurate at a desired landing position on a surface. For example, this may be the case where an object is to be accurately placed on a delicate surface that may damage easily.

Some placing mechanism enable placing of an object on a desired landing position at a reproducible accuracy close to 10 micrometer. Although this is tremendously accurate for most applications, some applications may even require a higher placement accuracy.

SUMMARY OF THE INVENTION

It is an object of the present invention to provide a highly accurate placing mechanism, that enables to place a carrier onto a flat surface with a reproducible accuracy being higher than achievable with prior art methods. Moreover, it is a further object to obtain such accuracy using a placement method and placement arrangement that allows a high throughput, i.e. enabling to execute the placement relatively fast.

To this end, there is provided herewith a method of positioning a carrier on a flat surface using an positioning member, wherein the carrier comprises an upper part and a base which are connected to each other such as to be arranged remote from each other, wherein the positioning member is arranged between the base and the upper part such that the base is located at an opposite side of the positioning member with respect to the upper part of the carrier, the upper part resting on the positioning member prior to placing of the carrier onto the flat surface, wherein the upper part comprises three engagement elements, and wherein the positioning member comprises a support surface for receiving the three engagement elements of the upper part, said support surface including a plurality of sockets forming a kinematic mount for said three engagement elements, wherein the base comprises three landing elements, each landing element being associated with a respective one of the three engagement elements, and the method comprising the steps of: operating the positioning member for moving the carrier relative to the flat surface in a direction parallel thereto such as to position the carrier above a landing position; performing an action of placing the carrier on the flat surface at the landing position, said action of placing comprising: moving the base towards the flat surface until at least one of said landing elements is in contact with the flat surface and an associated engagement element of said engagement elements is released from the kinematic mount; continue said moving of the base relative to the flat surface until all landing elements are in contact with the flat surface; and continue said action of placing the carrier until all engagement elements are released from the kinematic mount.

In the method in accordance with the present invention, a required level of accuracy is obtained by integrating the use of a kinematic mount in the placement process. In fact, the reproducible accuracy of the placement method of the present invention is obtained by realizing that placement inaccuracy is often caused by over constraining (putting too much constrains) of movement of the object during placement thereof. The required accuracy obtainable with the placement mechanism in accordance with the present invention may for example be used in situations wherein an object has to be accurately placed on a very sensitive surface which is highly prone to scratching and damaging. In such applications, over constraining of the object during placement may cause undesired movement during the placement process, causing the underlying surface to be scratched.

In the placement method of the present invention, a carrier consisting of an upper part and a base is placed on a flat surface with the help of a positioning member. This positioning member may for example comprise an extendible arm, but could as well comprise other elements, or it could be a different type of positioning structure, such as a movable frame, a rail guided element, or the like. Hereinafter, the positioning member will often be assumed to be an extendible arm, but the teachings of this documents can be likewise applied to any other type of positioning member. The positioning member first moves the carrier above the surface and parallel thereto, such as to move the carrier over the desired landing position. Once the carrier is above the desired landing position, placement of the carrier is to be carried out at high accuracy in a reproducible manner. This prevents the landing elements of the carrier from scratching the surface. The landing elements in the present invention may comprise any of a group comprising: landing feet, suction force clamps, magnetic clamps, or electrostatic clamps. Landing feet may simply allow positioning by means of gravity only. In addition to only fixing the landing elements to the flat surface by means of gravity, additional fixing force may be applied for example by using suction force clamps, magnetic clamps, or electrostatic clamps.

For placing the carrier onto the flat surface, the base of the carrier is moved towards the flat surface until at least one of the landing elements is in contact with the flat surface. Prior to this at least one landing element touching the flat surface, an associated engagement element of the upper part of the carrier, which is associated with the respective landing element, is restrained by the kinematic mount. The engagement elements could be of any type, but are configured to cooperate with the sockets of the kinematic mount. For example, the engagement elements may be pillars, legs, knobs or other structural elements that may engage with the sockets (or rest on the surface in absence of a socket, e.g. in one part of the kinematic mount). The engagement elements may for example comprise suitable feet, e.g. spherical or semispherical ball type feet, cones, or the like.

Kinematic mounts have been developed for very accurately mounting optical elements such as mirrors onto a surface in an adjustable manner. To reduce mounting inaccuracy, and to enable the mounting inaccuracy to be manageable, the kinematic mount has been designed to restrain exactly as many dimensions as required for each of three mounting points. Various types of kinematic mounts exist, but for the present invention, good results have been achieved using a Kelvin clamp type kinematic mount as will be explained further on below.

The invention is based on the insight that the concept of restraining just as many dimensions of each of the three engagement elements as is exactly required during landing, enables to reduce the landing inaccuracy considerably. To achieve this, the restraining of the dimensions of each of the landing elements is performed remotely from where these landing elements are located on the carrier. Therefore, the carrier comprises three engagement elements, wherein each of the three engagement elements corresponds with an associated landing element. Once the landing element is accurately placed where this is desired on the flat surface, the coupling with the kinematic mounts is released, by releasing the associated engagement element from the kinematic mount. In the example of a Kelvin clamp type kinematic mount, the support surface on the positioning member which comprises the kinematic mount includes two sockets for receiving two of the three engagement elements. In the Kelvin clamp type kinematic mount, the first socket restrains movement of the engagement element in each direction parallel to the support surface. A second socket restrains movement of a second engagement element in one dimension across the support surface, i.e. a rotation around the first engagement element. The third engagement element is not constrained on the support surface. Throughout the present description, reference is made to the engagement elements being located on the upper part while the sockets of the kinematic mount are located on the support surface on the positioning member. However, as may be appreciated, in an alternative implementation, it is likewise possible that the engagement elements are located on the positioning member while the sockets of the kinematic mount are located on a support surface on the upper part.

In accordance with an embodiment, said action for placing the carrier includes at least one of a group comprising: moving the positioning member relative to the flat surface, or moving the flat surface relative to the positioning member, for decreasing the distance between the positioning member and the flat surface; extending an extension element arranged between the base and the upper part on the carrier such as to increase a distance between the base and the upper part. The extension element may be arranged to move in one (e.g. vertical or Z-direction), while being stiff in the other degrees of freedom.

As will be appreciated, placing of the carrier onto the flat surface can be performed in different ways. For example the extendible arm type positioning member, which is designed to move the carrier over the landing position (i.e. in directions parallel to the flat surface) may further be arranged for being lowered towards the flat surface. By lowering the carrier towards the flat surface, at some point at least one of the landing elements will contact the flat surface. When all landing elements are in contact with the flat surface, further lowering of the positioning member will release the last of the three engagement elements from the kinematic mount and will increase the distance between the kinematic mount and the three engagement elements. The carrier is then standing freely on the flat surface, i.e. free from the positioning member. As may be appreciated, instead of lowering the positioning member, also the flat surface onto which the carrier is to be placed may be moved upwards towards the positioning member such as to decrease the distance between the positioning member and the flat surface. In principal, this works in exactly the same manner only instead of the positioning member being moved, in this alternative the flat surface is moved towards the positioning member.

In yet a third alternative implementation, it is not necessary to lower the positioning member towards the flat surface or to move the flat surface upwards towards the positioning member, but instead the carrier comprises an extension element that may be operated using an actuator. The extension element extends between the base and the upper part. By extending the extension element, the separation between the base and the upper part becomes larger, i.e. the distance between the top of the base and the lower side of the upper part will increase. While the carrier suspends from the positioning member, having its three legs in contact with the kinematic mount on the support surface of the positioning member, extending the extension element will lower the base towards the flat surface. Once at least one of the landing elements touches the flat surface, the engagement element associated with this respective landing element will be released from the kinematic mount when extension of the extension element is continued. Once all landing elements are in touch with the flat surface, further extending the extension element will cause the upper part to be pushed upwards, while still increasing the separation between the base and the upper part of the carrier. This causes the release of the last of the three engagement elements from the kinematic mount, and further extension of the extension element will increase the distance between the three legs and the kinematic mount. The carrier will then rest on the flat surface, free from the positioning member. This may for example be used for approaching a probe tip of an atomic force microscopy device towards a sample surface, although it is not limited to this particular example application.

In accordance with a further embodiment, the kinematic mount is a Kelvin clamp type kinematic mount comprising a first socket and a second socket, wherein the first socket is shaped such as to restrain sliding of an associated first engagement element of said engagement elements in each direction parallel to the support surface, wherein the second socket is shaped such as to restrain sliding of an associated second engagement element of said engagement elements in one direction parallel to the support surface, and wherein a third engagement element is arranged to rest onto the support surface unrestrained in a direction parallel to the support surface, wherein each one of said first, second and third engagement element is respectively associated with a first, second and third landing element of said three landing elements; and wherein during said action of placing the carrier on the flat surface, said carrier is held oriented under an angle with the flat surface such that consecutively the first landing element lands first, the second landing element lands second, and the third landing element lands last on the flat surface.

In a Kelvin clamp type kinematic mount, the first socket restricts movement of the first engagement element in all directions across the support surface of the positioning member. Because the first engagement element is restrained in the first socket while the base is moved towards the flat surface, prior to the first landing element being in touch with the flat surface, any sideways movement of the landing element is effectively prevented. Therefore, the first landing element lands exactly on the intended spot for this landing element on the landing position. Ideally, immediately upon landing of the first landing element onto the flat surface, the coupling between the first engagement element and the first socket is released. Due to being in touch with the flat surface, sideways movement of the landing element across the flat surface is prevented by friction forces. Therefore, of the degrees of freedom available, once the first landing element is in contact with a flat surface, the degrees of freedom relating to translation in the x, y, and z directions are constrained. However, rotation around the x, y, and z axis is not constrained. Optionally, the above may for example be realized by using a stiff connection between upper and lower part in the degrees of freedom (DOF) constraint by the element and a compliant connection for the unconstraint elements; as will be explained further below.

Continue lowering the base towards a flat surface will cause the base to tilt until the second landing element will touch the surface. Scratching of the flat surface by the second element is effectively prevented by only constraining rotation of the base about the axis through the first landing element. The second socket of the kinematic mount is therefore designed to constrain this additional degree of freedom during movement. Once the first and the second landing element are in touch with the flat surface, the base will rotate around a virtual axis through the first and the second landing element until the third landing element touches the flat surface. Because the first and the second engagement element are released from the first and the second socket of the kinematic mount upon contact of the first and the second landing element respectively, the degrees of freedom of movement of the base with respect to the flat surface are, prior to landing of the third landing element, only constrained by the first and second landing elements being in touch with the flat surface. This effectively prevents scratching of the third landing element on the flat surface.

In case any of the degrees of freedom would be over constrained, vibrations or any other undesired movement or even temperature changes could be effectively transferred onto the flat surface through the landing elements upon landing, thereby causing a scratch. By restraining exactly those degrees of freedom that need to be constrained during placing of the carrier onto the flat surface, such scratching is effectively prevented.

The method may, in accordance with yet another embodiment further include a step of removing the carrier from the flat surface, wherein for removing the carrier the steps of said action of placing the carrier are performed in a reversed order, and wherein during said removing the positioning member is held oriented in an angled position relative to the flat surface such that the third engagement element of said three engagement elements first makes contact with the support surface of the positioning member, and such that the second engagement element of said three engagement elements subsequently makes contact with the second socket, and such that after said second engagement element makes contact, the first engagement element makes contact with the first socket.

Removing of the carrier from the flat surface by picking it up can be done in exactly the reversed order. When the carrier needs to be removed from the flat surface, the third landing element is lifted first while simultaneously making the third engagement element contact the kinematic mount (i.e. the support surface of the positioning member because no socket is available for the third engagement element in a Kelvin clamp type kinematic mount). Next, the second engagement element makes contact with the second socket simultaneously with lifting the second landing element from the flat surface. Then the first engagement element will be made to engage with the first socket while simultaneously lifting the first landing element. Exactly in the same manner as with the placing, but then in reversed order, not over constraining the degrees of freedom during removal of the carrier from the flat surface prevents any vibrations or other disturbances from causing these landing elements to scratch or slip on the flat surface.

In accordance with a second aspect of the invention, there is provided an assembly of a carrier and a positioning member, said assembly being arranged for positioning the carrier on a flat surface using the positioning member, wherein the positioning member is arranged for moving the carrier relative to the flat surface in a direction parallel thereto such as to enable positioning of the carrier above a landing position, wherein the carrier comprises an upper part and a base which are connected remote from each other, wherein the positioning member is arranged between the base and the upper part of the carrier such that the base and the upper part are located at opposite sides of the positioning member, the upper part by means of three engagement elements resting on the positioning member in use prior to placing of the carrier onto the flat surface, wherein the positioning member comprises a support surface for receiving the three engagement elements of the upper part, said support surface including a plurality of sockets forming a kinematic mount for said three engagement elements, wherein the base comprises three landing elements, each landing element being associated with a respective one of the three engagement elements, wherein the assembly is further arranged for performing an action for placing the carrier on the flat surface at the landing position by moving the base towards the flat surface until at least one of said landing elements is in contact with the flat surface and an associated engagement element of said engagement elements is released from the kinematic mount, and for continuing said moving of the base relative to the flat surface until all landing elements are in contact with the flat surface, and for continuing said action of placing the carrier until all engagement elements are released from the kinematic mount.

As may be appreciated, the placing of the carrier onto the flat surface in the described manner may be achieved in various ways. For example, either the positioning member can be moved towards the flat surface, or the flat surface may be moved towards the positioning member. However, it is also possible to provide an extension element in between the upper part and the base, and to extend the height of the upper part above the base (i.e. the distance spanning the separation between the base and the upper part). In this latter embodiment, while the engagement elements of the upper part rest on the support surface, extending the extension element will bring the base closer to the flat surface. Once at least one of the landing elements touches the flat surface, further extending the extension element will automatically result in the corresponding engagement element (with which the landing element is associated) being released from the support surface. Once all landing elements are in contact with the flat surface, further extension of the extension element will result in the upper part being pushed upwards, resulting in all of the engagement elements being released and the carrier standing on the flat surface while not in contact with the positioning member. Therefore, in accordance with various embodiments, for performing said action for placing the carrier on the flat surface, the assembly may be characterized by at least one of a group comprising: the positioning member is movable relative to the flat surface for decreasing the distance between the positioning member and the flat surface; the assembly further comprising the flat surface, wherein the flat surface is arranged for being moved relative to the positioning member for decreasing the distance between the positioning member and the flat surface; and the carrier comprises an extension element arranged between the base and the upper part, wherein the extension element is extendible such as to change a distance between the base and the upper part.

In accordance with a further embodiment, the kinematic mount is a Kelvin clamp type kinematic mount comprising a first socket and a second socket, wherein the first socket is shaped such as to restrain sliding of an associated first engagement element of said engagement elements in each direction parallel to the support surface, wherein a second socket is shaped such as to restrain sliding of an associated second engagement element of said engagement elements in one direction parallel to the support surface, and wherein a third engagement element is arranged to rest onto the support surface unrestrained in a direction parallel to the support surface, wherein each one of said first, second and third engagement element is respectively associated with a first, second and third landing element of said three landing elements.

The advantages of using a Kelvin clamp type kinematic mount in the assembly of the present invention have been explained above with reference to the disclosed method of picking up the carrier from the flat surface. These advantages are likewise applicable to the present assembly.

The first socket of the kinematic mount may, in accordance with further embodiments of the invention, be shaped in accordance with at least one element of a group comprising: a pyramid, such as a tetrahedron, a square pyramid, a pentagonal pyramid, a hexagonal pyramid, or other polygonal pyramid, or a star pyramid; a truncated pyramid having a truncation at a bottom of the socket, such as a truncated tetrahedron, a truncated square pyramid, a truncated pentagonal pyramid, a truncated hexagonal pyramid, or other truncated polygonal pyramid, or a truncated star pyramid; a cone; or a truncated cone. Cooperating with the shape and size of the engagement elements the abovementioned designs of the first socket allow to provide a socket that restricts movement of the engagement element in all surface directions. Moreover, in a further embodiment, the second socket is a straight groove, wherein the straight groove is aligned such that its length direction points towards the first socket.

In accordance with yet a further embodiment, there is provided an assembly in accordance with the second aspect wherein one or more or each of said three engagement elements includes a compliant connection with the upper part such as to allow flexible bending of the one or more engagement element relative to the upper part, and wherein upon landing of at least one of the landing elements friction forces on the at least one landing element parallel to the flat surface are at least partially compensated by flexing of said engagement elements.

As referred to above, during placing or picking up of the carrier on or from the flat surface, preferably the first, second and third landing element are consecutively placed on the flat surface (or lifted therefrom). To achieve this, whilst suspending from the positioning member during lowering of the base, the carrier is preferably oriented in a slight angled orientation (e.g. mostly towards the first landing element and a little bit towards a second landing element). Therefore, for example upon landing of the first landing element, the tilted orientation of the carrier causes the gravity and landing forces to be slightly tilted with respect to the alignment between the first landing element and a first engagement element. This results in a small force component parallel to the flat surface. As long as this small force component is smaller than the friction force, no undesired slipping will happen. However, in case this small force component becomes larger than the friction force, slipping or scratching may still occur. Therefore, in accordance with a preferred embodiment the engagement elements are attached to the carrier by means of a compliant connection. By using a compliant connection between the engagement elements and the other part of the carrier, the four components parallel to the flat surface and friction forces are compensated by a slight flexing of the engagement elements in the required direction. Therefore, providing this design flexibility to the engagement elements of the carrier further reduces inaccuracy of the placement mechanism, further preventing scratching of the flat surface.

The compliant connection may, in accordance with a further embodiment, comprise at least one of a group comprising: a thinned section of said one or more or each engagement element such as to allow flexing thereof relative to the upper part; and/or a magnetic type flexible coupling. A magnetic type flexible coupling is for example described further below, providing the required flexibility.

In a further embodiment of the assembly in accordance with the invention, at least one or all of the three engagement elements is aligned with its associated landing element in a direction transverse to the flat surface when in use the carrier rests on the flat surface. Such an alignment is advantageous for each one of the engagement elements and associated landing elements for a number of reasons. For example, such an alignment ensures that when the landing element contacts the surface, upon continuing of the action of placing (e.g. by moving the base further relative to the flat surface) the associated engagement element is released from the kinematic mount. Moreover, forces on the carrier during placing are predictable in this manner. The carrier can be placed on the flat surface without any undesired deflection or rotation of the carrier relative to the positioning member in a direction having a component orthogonal to the movement of the base towards the surface.

In a particular embodiment, wherein the carrier supports a component of a scanning probe microscopy device, the first engagement element may be aligned with the first landing element in a direction transverse to the flat surface when in use the carrier rests on the flat surface, and the upper part of the carrier further supports a scanning probe microscopy device including a probe having a probe tip for scanning a sample surface, wherein the probe tip is aligned with the first socket and the first landing element. It is particularly advantageous to align the probe tip with the first engagement element and the first landing element, because the metrology loop (i.e. from tip to sample) is thereby kept as short as possible (directly through the first engagement element and the first landing element through the flat grid surface of the microscope).

The invention, in accordance with a third aspect, relates to a carrier for use in an assembly according to the second aspect, the carrier comprising an upper part, a base, and an extension element, wherein the extension element is arranged between the upper part and the base for moving the base to and from the upper part, wherein the carrier is arranged for receiving a positioning member between the base and the upper part of the carrier, wherein the upper part comprises three engagement elements arranged for being in contact with a support surface of the positioning member, said support surface including a plurality of sockets forming a kinematic mount for said three engagement elements, wherein the base comprises three landing elements, each landing element being associated with a respective one of the three engagement elements, wherein the extension element is arranged for extending such as to approach a landing position on the flat surface with the base and to continue extending the extension element until the engagement elements of the upper part are free from the kinematic mount formed by the sockets and the support surface.

The invention, in accordance with a fourth aspect, relates to a positioning member for use in an assembly in accordance with the second aspect, wherein the positioning member is extendible for moving a carrier relative to a flat surface in a direction parallel thereto such as to position the carrier above a landing position, wherein the positioning member is arranged for being received between a base and an upper part of the carrier, said carrier further including an extension element arranged between the upper part and the base for moving the base to and from the upper part, wherein the positioning member comprises a support surface for receiving three engagement elements of the upper part of the carrier, said support surface including a plurality of sockets forming a kinematic mount for said three engagement elements.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 1 schematically illustrates an embodiment of the present invention;

FIG. 2 schematically illustrates a kinematic mount located on an extendible arm in an embodiment of the present invention;

FIGS. 8A-8C and 9A-9C illustrate histograms of test results of a positioning method in accordance with the invention.

DETAILED DESCRIPTION

Figure 3B:
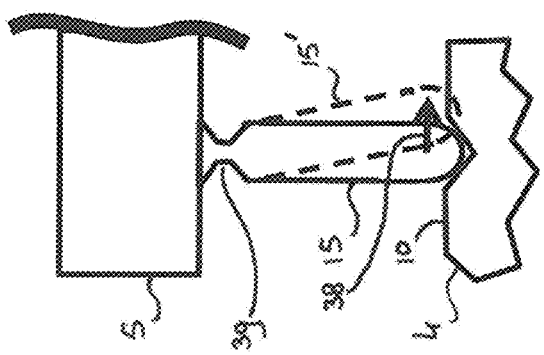
FIGS. 3a and 3b illustrate the tilted position during landing of an embodiment of the present invention onto a flat surface.

In FIG. 1, an assembly 1 comprising an extendible arm 4 and a carrier 3 is schematically illustrated. The carrier 3 comprises an upper part 5 and a base 6. The base 6 is connected to the upper part 5 by means of an extension element 8. The upper part 5 of the carrier 3 may be arranged for supporting an object 30. The object 30 may for example be a component of a scanning probe microscopy device, or a different object that is to be placed accurately at a specific landing position. The flat surface 9 onto which the carrier 3 is to be placed may be any arbitrary flat surface, although in the example of a scanning probe microscopy device, the flat surface may be a positioning grid that cooperates with a positioning encoder (not shown) to very accurately determine the exact position of the carrier 3 relative to the flat grid surface 9. Such positioning grid surfaces are highly prone to scratching, and allow to determine the position of the carrier 3 at micrometer accuracy.

The extendible arm 4 comprises a support surface 10. The support surface 10 comprises a first socket 11 and a second socket 12. A first socket 11 and a second socket 12, together with the support surface 10 itself, forms a kinematic mount for three pillars 14, 15, and 16 of the carrier 3. The pillars 14, 15, and 16 are connected to the upper part 5 of the carrier 3. The pillars 14, 15, and 16 extend in the direction of gravity towards the support surface 10 of the extendible arm 4. At the ends of the three pillars 14, 15, and 16, there are located spherical or semi-spherical pillar feet 19, 20 and 21 respectively. Each of the pillar feet 19, 20 and 21 engages with the kinematic mount. To this end, pillar foot 19 engages in the first socket 11, pillar foot 20 engages in the second socket 12, and pillar foot 21 rests on the support surface 10 of the extendible arm 4. The second pillar 15 and the third pillar 16 also comprise compliant connections 17 and 18 respectively that allow a desired degree of bending such as to compensate for any friction forces during landing. In the present embodiment, the pillars 14, 15 and 16 form the engagement elements; however, it will be appreciated that these do not necessarily have to be pillars or height extending elements of any kind, and could as well be formed as different structural elements.

Extension element 8 extends through opening 23 of extendible arm 4. The base 6 is located at an opposite side of the extendible arm 4 with respect to the upper part 5. At the lower side of the base 6, three landing elements 25, 26 and 27 are located. It is noted that landing elements 25, 26 and 27 have been made visible in the schematic drawing of FIG. 1 although they are in reality located underneath the base 6 and would therefore be invisible from the view point taken. In FIG. 1, the assumed invisibility of these landing elements 25, 26 and 27 is suggested by drawing these elements with dotted lines. The first landing element 25 is associated with a first pillar 14. The first landing element 25 is aligned with the first pillar 14 in the direction perpendicular to the flat surface 9. Moreover, the second landing element 26 is associated with the second pillar 15, and is aligned with the second pillar 15 in a direction perpendicular to the flat surface 9 as well. Lastly, the third landing element 27 is associated with the third pillar 16, and is aligned with the third pillar 16 in the direction perpendicular to the flat surface 9. In the illustration of FIG. 1, the pillars 14, 15 and 16 are engaged in the kinematic mount (first socket 11, second socket 12 and support surface 10) and the base 6 is located above the flat surface 9. The directions x, y, and z are indicated by coordinate system 31.

In FIG. 2, the support surface 10 of the extension arm 4 is schematically illustrated. The support surface 10 comprises the first socket 11 of the kinematic mount. The first socket 11 is a tetrahedral shaped indentation in the surface 10 of the arm 4. Pillar foot 19 fits neatly in the first socket 11 preventing (when engaged) slipping of the foot 19 in any direction across the surface 10.

Surface 10 further includes a second socket 12 designed to receive pillar food 20 of the second pillar 15. Second socket 12 is a V-type groove in the support surface 10. The apex of the groove is aligned with a virtual line through the mid point of first socket 11 and the mid point of second socket 12. By this alignment of second socket 12, rotation around an axis through the first pillar 14 is effectively prevented, by preventing pillar foot 20 from moving in a direction perpendicular to the virtual line 34. The first socket 11 and the second socket 12 together constrain the degrees of freedom of translation of food 19 across surface 10, and rotation of the carrier around the axis through the first pillar 14. The third pillar foot 21 rests on the support surface 10 without being constrained by a socket. As will be appreciated, movement of any of the feet 19, 20, and 21 in the z direction, i.e. the direction into and out of the paper, is semi-constrained in the sense that the flat surface 10 prevents the feet 19-21 from moving below the surface 10, although movement in the upward direction (as seen from the paper) is of course possible for each of the feet 19-21.

The location of the center of gravity 33 above the surface 10 is schematically indicated in FIG. 2. The center of gravity is approximately located above the center line 35 through the arm 4 and the first socket 11.

Figure 3A:
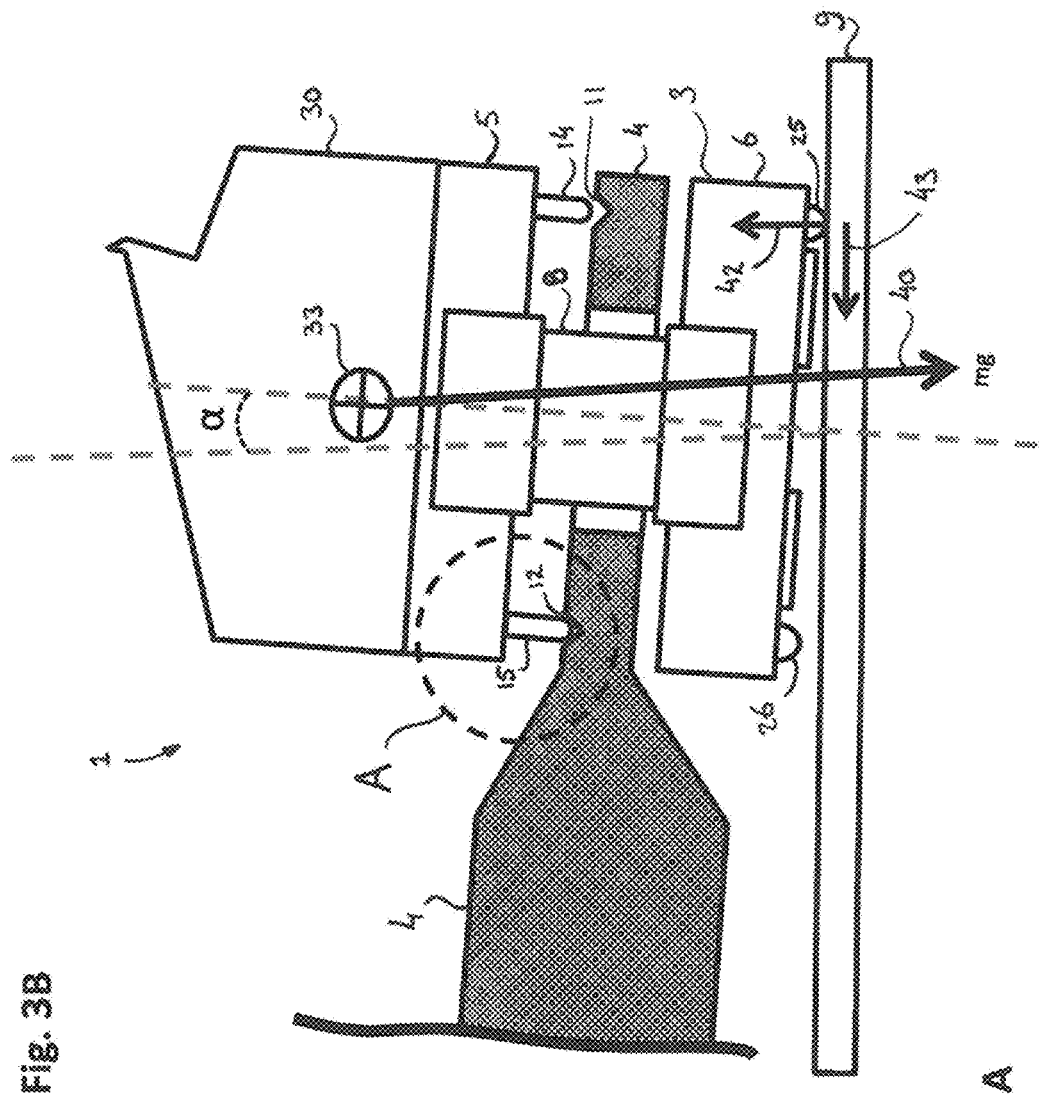

FIGS. 3a and 3b schematically illustrate behavior of the assembly illustrated in FIG. 1 during placement of the carrier 3 onto the flat surface 9. Tilting of the carrier 3 with respect to the flat surface 9 has been exaggerated in FIGS. 3a and 3b for illustration only. In reality, the tilting of the carrier 3 relative to the flat surface 9 during landing is small, and only just enough to ensure that the first landing element lands first, the second landing element lands second and the third landing element lands third on the flat surface 9. In FIG. 3a, first landing element 25 and second landing element 26 have been schematically illustrated. FIG. 3a further illustrates first socket 11 and second socket 12. The center of gravity 33 is also illustrated in FIG. 3a. The direction of the gravity is indicated by arrow 40.

As a result of the tilted orientation of the carrier 3 with respect to the flat surface 9, upon movement of the base 6 towards the surface 9, the first landing element 25 first touches the flat surface prior to the other landing elements. As can be seen, the first landing element 25 is already in contact with the flat surface 9, and the associated first pillar 14 is released from the socket 11. In this position, because the landing element 25 rests on flat surface 9 without the other landing elements 26 and 27 being in touch with the surface 9, the force of gravity 40 and the reaction force 42 from the surface 9 are not aligned. Mechanically, this tends to incur a rotation of the carrier that is prevented by friction force 43. Similar forces are present between the second leg 15 and the second socket 12 that restricts its motion. If the friction force 23 is no longer capable of preventing rotation, the landing element 25 would slip on the flat surface 9 resulting in a scratch thereon. To prevent this from happening, as illustrated in FIG. 3b, the second leg 15 comprises a thinned section 39 which allows a certain amount of bending of the leg 15. The thinned section 39 forms a compliant connection. As a result of the force 38 illustrated in FIG. 3b, the second pillar 15 may bend as illustrated by the dotted pillar 15'. This bending of the second pillar reduces the forces on the first landing element 25 such as to prevent scratching. In FIG. 3a, the tilting of the carrier 3 relative to the normal through the flat surface 9 is designated by a. Moreover, the circled area A indicates the enlarged portion illustrated in FIG. 3b.

Figure 4:
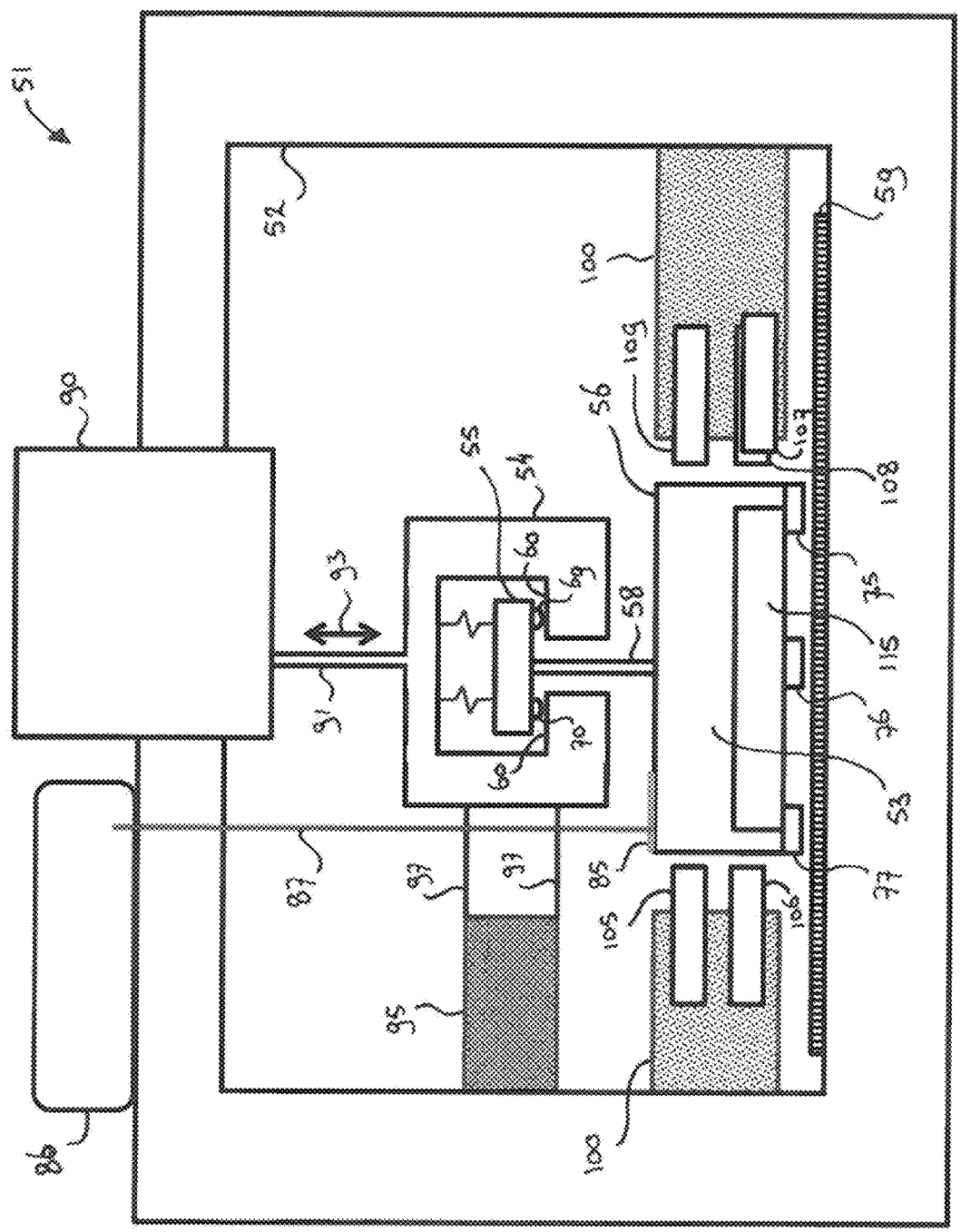
FIG. 4 illustrates a different embodiment of an assembly in accordance with the present invention.

FIG. 4 illustrates a different embodiment of an assembly in accordance with the present invention. In the embodiment illustrated in FIG. 4, a frame 52 supports the various parts of the assembly. The extendible arm 54 is implemented in the embodiment illustrated in FIG. 4 connected through part 91 to an actuator 90. The actuator 90 allows to move the extendible arm 54 parallel to the surface 59, and also perpendicular thereto as indicated by double arrow 93. The carrier 53 comprises an upper part 55 and a base 56. The upper part 55 and the base 56 are connected by a static element 58 (which is not extendible). Placing of the carrier 53 onto the flat surface 59 (after accurately positioning it above a desired landing position) is performed by lowering the arm 54. The upper part 55 comprises pillars with landing feet 69 and 70. The feet 69 and 70 cooperate with a kinematic mount located on the surface 60 of the arm 54. An interferometer 86 accurately allows to determine the height of the carrier 53 above the surface 59 by impinging a laser beam 87 onto a mirror 85. The sideways translation, i.e. translation in the directions parallel to the surface 59, as well as the rotation can be accurately determined using capacitive sensors 105, 106, 107, 108 and 109. These capacitive sensors 105-109 are mounted on structural elements 100 attached to the frame 52.

The first landing element 75, second landing element 76, and third landing element 77 respectively corresponds to three pillars of the upper part 55. The first pillar 69 and the second pillar 70 are illustrated, and the third pillar is not visible as being located behind the static connection 58. A positioning encoder 115 cooperates with the positioning grid surface 59 such as to allow accurate determination of the position of the carrier 53 on the surface 59.

Undesired movement of the arm 54 in a sideways direction is restricted by means of leaf springs 97 connected to structure 95 to the frame 52. Although the assembly 51 accurately allows to position the carrier 53 onto the flat surface 59, and clearly illustrates how to enable accurate positioning of the carrier in a different manner in accordance with the present invention, a disadvantage of the embodiment illustrated in FIG. 4 is that the location of the arm 54 relative to the upper part 55 of the carrier limits the usability of the upper part 55 for supporting an object. Moreover, the landing elements 75, 76, and 77 in this embodiment, although being located in a suitable position with respect to the three pillars of the upper part 55, are not aligned with three pillars and the metrology loop is not optimized.

Figure 5:
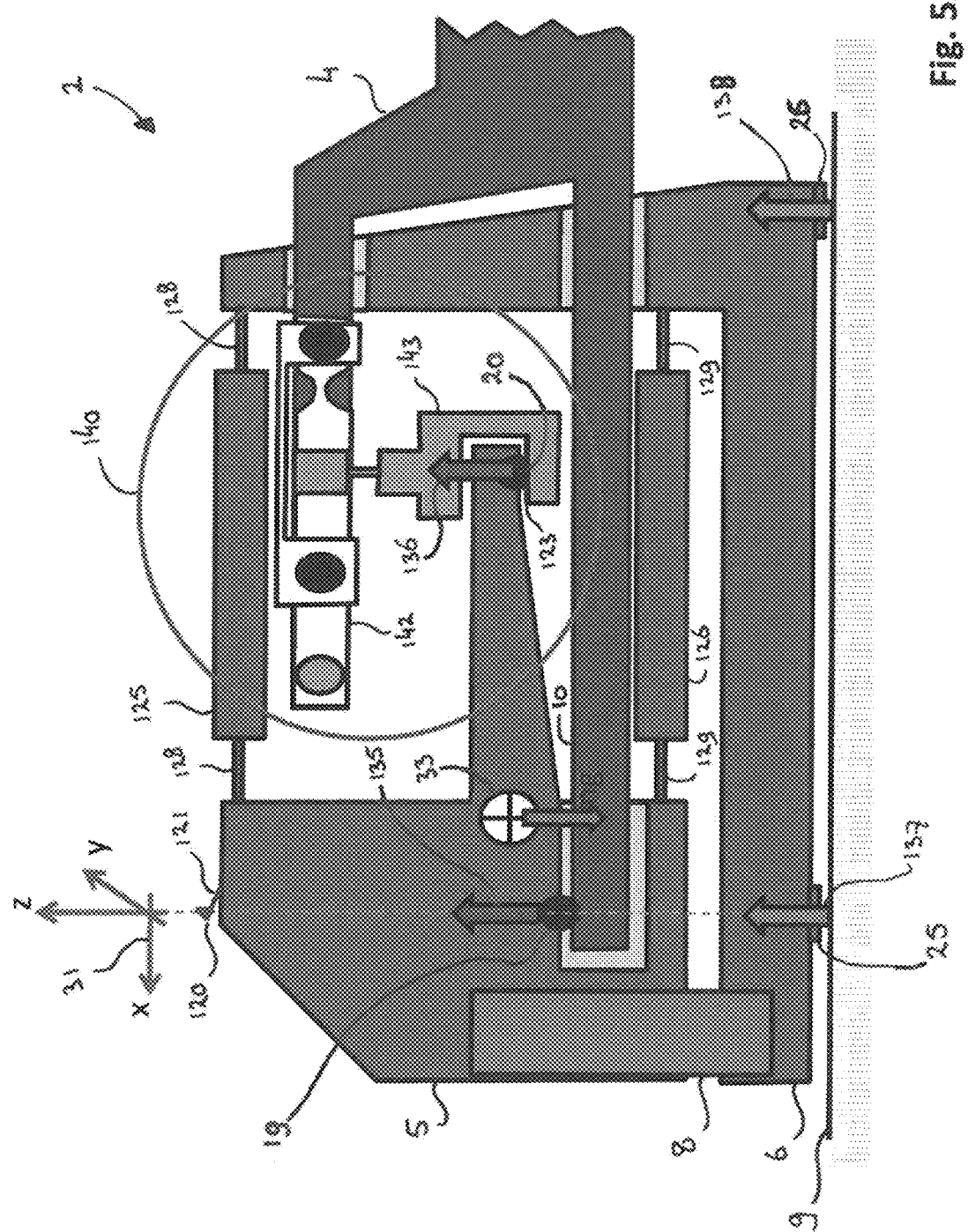
FIG. 5 illustrates yet a further embodiment of an assembly in accordance with the present invention.

A further embodiment of an assembly in accordance with the present invention is illustrated in FIG. 5. Again FIG. 5 illustrates the extendible arm 4, the base 6 and the upper part 5. The base 6 and the upper part 5 are connected by an extension element 8. Sideways movement of the upper part 5 relative to the base 6 is further prevented by means of leaf springs 128 and 129 of guidance elements 125 and 126 respectively. The center of gravity of the assembly is illustrated in point 33.

FIG. 5 further illustrates first pillar foot 19 of the first pillar and second pillar foot 20 of the second pillar. The first pillar foot 19 aligns with the first landing element 25 in a direction normal to the grid surface 9. Moreover, the upper part 5 comprises a component of a scanning probe microscopy device comprising a probe 121 having a probe tip 120. The probe tip 120 is aligned with the foot 19 of the first pillar and the landing element 25. The metrology look section from the probe tip towards the flat grid surface 9 is therefore kept as short as possible. The first pillar foot 19 rests in a socket (not illustrated) on the support surface 10 of the arm 4. The second foot 20 of the second pillar rests on surface 123 which is connected to the arm 4 by an adjustable element 143 with an adjustable connection 142. Any forces are schematically indicated by arrows 135, 136, 137 and 138.

Figure 6:
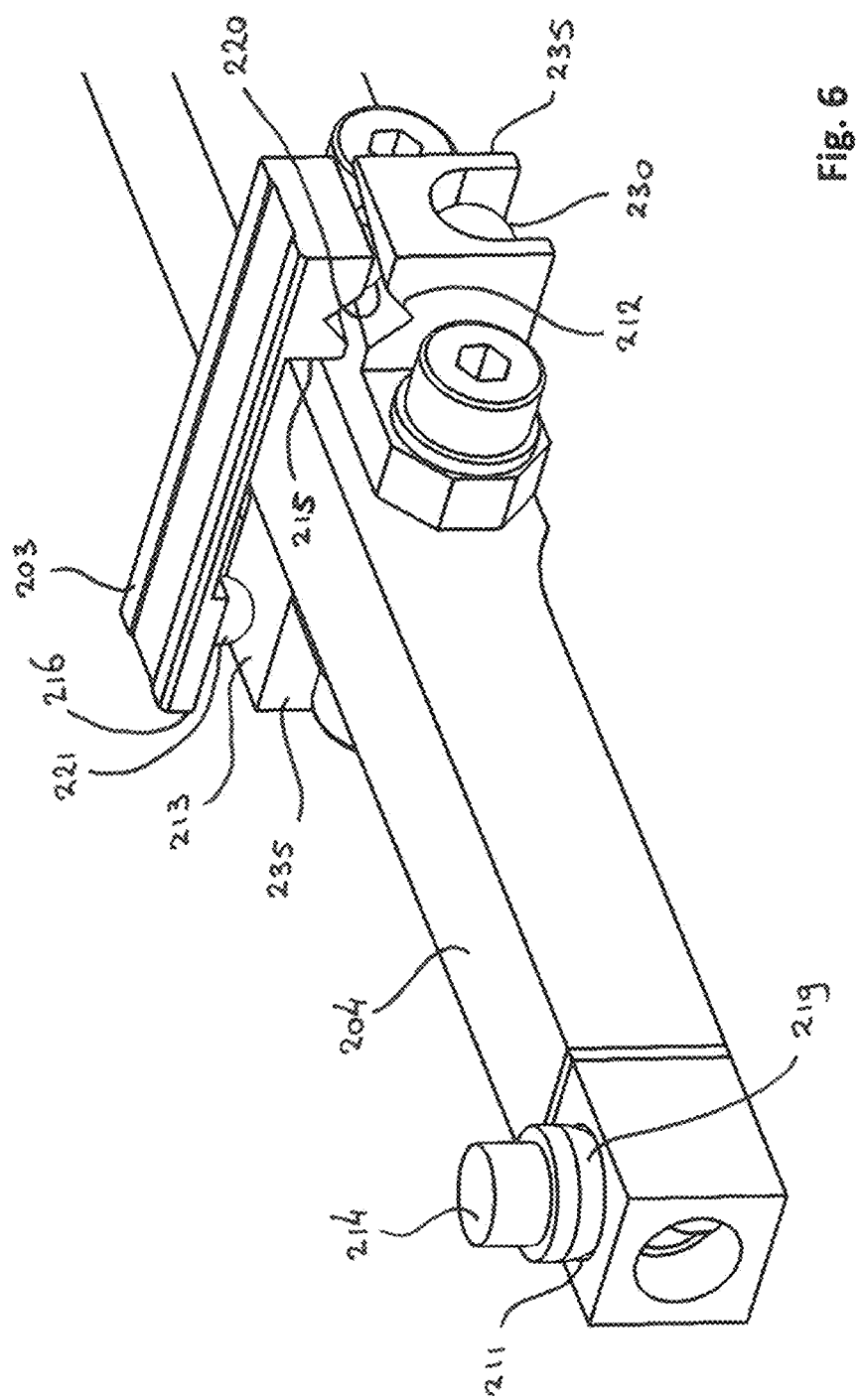
FIG. 6 illustrates a further embodiment of a kinematic mount applied to an embodiment of the present invention.

FIG. 6 illustrates an upper part 203 and an extendible arm 204, in accordance with a further embodiment comprising compliant connections arranged in the engagement elements. The upper parts 203 comprises engagement elements 215, 216 and 214 (note that only a small part of the upper part 203 is visible in FIG. 6, and that the upper part 203 is also connected to element 214 although this is not visible). The engagement elements 215 and 216 comprise compliant connections upon engagement with the sockets 212 and 213 of the kinematic mount. The compliant connections are formed by ball magnets 220 and 221 providing a magnetic type compliant connection. The ball magnets 220 and 221 cooperate with an associated magnet 230 arranged in each of the holder structures 235 on either side of the arm 204. Further shown in FIG. 6 is the engagement element 214 including a cone type engagement element foot 219 in engagement with a corresponding socket 211 of the kinematic mount.

Figure 7:
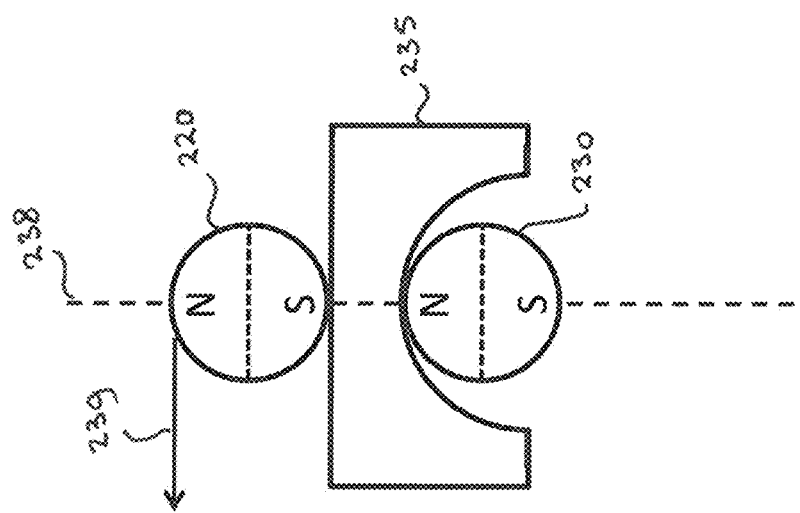
FIG. 7 illustrates a magnetic type compliant connection usable in the present invention.

In FIG. 7, the principle of the magnetic type compliant connection is schematically illustrated. FIG. 7 illustrates the holder structure 235 including the ball type magnet 230. On the flat upper surface of holder element 235, further ball type magnet 220 is in magnetic engagement with ball type magnet 230. In FIG. 7, for each of the ball type magnets 220 and 230, the magnetic poles are indicated by N and S. The ball type magnets 220 and 230, within each others magnetic fields, are aligned along the axis 238 illustrated as a dotted line. In case a force 239 would be applied to the upper part of ball type magnet 220, a magnetic reaction force (not shown) will cause the magnet 220 to be realigned with the axis 238. Therefore, the arrangement of parts illustrated in FIG. 7 provides for a stable compliant magnetic type connection that may be applied in the present invention. Instead of using two ball type magnets 220 and 230, in a different embodiment at least one of these ball type elements 220 or 230 may be magnetic while the other may be made of a material attracted by the magnet, e.g. a ferromagnetic material. For example, the ball type element 220 may be made of a ferromagnetic material.

FIGS. 8A-8C and FIGS. 9A-9C represent histograms of test results of a prototype positioning method of the present invention. During the test, a total of 500 landings were made using the positioning method of the present invention. The landings were made using a probe head of an atomic force microscope supported on the upper part of the carrier. The histograms of FIGS. 8A-8C illustrate the positioning accuracy for the x, y and z coordinates of the first landing element (e.g. landing element 25 of FIG. 1). The horizontal axis in the histograms indicates the deviation from the median landing position, whereas the vertical axis indicates the number of landings. As follows from the FIGS. 8A-8C, a landing accuracy with 90% of the landings within 0.1 micrometer is achievable using the method of the present invention. In FIGS. 9A-9C, histograms are given for the x, y and z coordinates of the probe tip of the AFM probe head, showing a corresponding accuracy. From the corresponding accuracy between the histograms of FIGS. 8A-C and FIGS. 9A-C, it can be determined that the placement accuracy of the other landing elements (e.g. landing elements 26 and 27 of FIG. 1) is similarly accurate.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

Hereinafter, various characteristics of various embodiments of the invention will be highlighted in a set of numbered clauses or paragraphs. These characteristics are not to be interpreted as being limiting on the invention or inventive concept, but are provided merely as an overview of characteristics of the invention as described in the description. The invention is only limited by the appended claims presented in the correspondingly named section. The number clauses include:

1. Method of positioning a carrier on a flat surface using a positioning member,
wherein the carrier comprises an upper part and a base which are connected to each other such as to be arranged remote from each other, wherein the positioning member is arranged between the base and the upper part such that the base is located at an opposite side of the positioning member with respect to the upper part of the carrier, the upper part resting on the positioning member prior to placing of the carrier onto the flat surface,
wherein the upper part comprises three engagement elements, and wherein the positioning member comprises a support surface for receiving the three engagement elements of the upper part, said support surface including a plurality of sockets forming a kinematic mount for said three engagement elements, wherein the base comprises three landing elements, each landing element being associated with a respective one of the three engagement elements, and
the method comprising the steps of:
extending the positioning member for moving the carrier relative to the flat surface in a direction parallel thereto such as to position the carrier above a landing position;
performing an action for placing the carrier on the flat surface at the landing position by moving the base towards the flat surface until at least one of said landing elements is in contact with the flat surface and an associated engagement element of said engagement elements is released from the kinematic mount;
continue said moving of the base relative to the flat surface until all landing elements are in contact with the flat surface; and
continue said action of placing the carrier until all engagement elements are released from the kinematic mount.

2. Method according to paragraph 1, wherein said action for placing the carrier includes at least one of a group comprising: moving the positioning member relative to the flat surface, or moving the flat surface relative to the positioning member, for decreasing the distance between the positioning member and the flat surface; extending an extension element arranged between the base and the upper part on the carrier such as to increase a distance between the base and the upper part.

3. Method according to paragraph 1 or 2, wherein each engagement element of said engagement elements comes free from kinematic mount upon landing of an associated landing element on the flat surface.

4. Method according to any of the previous paragraphs, wherein a first socket of said sockets forming the kinematic mount is shaped such as to restrain sliding of an associated first engagement element of said three engagement elements in each direction parallel to said support surface, said first engagement element further being associated with a first landing element of said three landing elements, and wherein during said extending of the extension element said carrier is oriented under an angle with the flat surface such that said first landing element is a first one of said landing elements to land on the flat surface.

5. Method according to any one or more of the previous paragraphs, wherein a second socket of said sockets forming the kinematic mount is shaped such as to restrain sliding of an associated second engagement element of said three engagement elements in one direction parallel to said support surface, said second engagement element further being associated with a second landing element of said three landing elements, and wherein during said extending of the extension element said carrier is oriented such that said second landing element is a second one of said landing elements to land on the flat surface.

6. Method according to any of the previous paragraphs, wherein a third engagement element of said three engagement elements is arranged for being in direct contact with the support surface remote from the sockets such as to be unrestrained in directions parallel to the support surface, said third engagement element further being associated with a third landing element of said three landing elements, and wherein during said extending of the extension element said carrier is oriented such that said third landing element is a third one of said landing elements to land on the flat surface.

7. Method according to any of the previous paragraphs, wherein one or more of said three engagement elements is compliantly connected to the upper part such as to allow flexible bending of the one or more engagement element relative to the upper part, and wherein upon landing of at least one of the landing elements friction forces on the at least one landing element parallel to the flat surface are at least partially compensated by flexing of said engagement elements.

8. Method according to any of the previous paragraphs, as far as dependent on each of paragraphs 4-6, further comprising a step of removing the carrier from the flat surface, wherein for removing the carrier the extension element is retracted for moving the base closer to the upper part, wherein during said retracting the method comprises:

maintaining the positioning member in an angled position relative to the upper part such that the third engagement element of said three engagement elements first makes contact with the support surface of the positioning member, and such that the second engagement element of said three engagement elements subsequently makes contact with the second socket following the said first contact between the first engagement element and the support surface, and such that after said second engagement element making contact, the first engagement element makes contact with the first socket.

9. Assembly of a carrier and a positioning member, said assembly being arranged for positioning the carrier on a flat surface using the positioning member, wherein the positioning member is arranged for moving the carrier relative to the flat surface in a direction parallel thereto such as to enable positioning of the carrier above a landing position, wherein the carrier comprises an upper part and a base which are connected remote from each other, wherein the positioning member is arranged between the base and the upper part of the carrier such that the base and the upper part are located at opposite sides of the positioning member, the upper part by means of three engagement elements resting on the positioning member in use prior to placing of the carrier onto the flat surface, wherein the positioning member comprises a support surface for receiving the three engagement elements of the upper part, said support surface including a plurality of sockets forming a kinematic mount for said three engagement elements, wherein the base comprises three landing elements, each landing element being associated with a respective one of the three engagement elements, wherein the assembly is further arranged for performing an action for placing the carrier on the flat surface at the landing position by moving the base towards the flat surface until at least one of said landing elements is in contact with the flat surface and an associated engagement element of said engagement elements is released from the kinematic mount, and for continuing said moving of the base relative to the flat surface until all landing elements are in contact with the flat surface, and for continuing said action of placing the carrier until all engagement elements are released from the kinematic mount.

10. Assembly according to paragraph 9, wherein the positioning member is movable relative to the flat surface for decreasing the distance between the positioning member and the flat surface.

11. Assembly according to paragraph 9 or 10, wherein the assembly further comprises the flat surface and wherein the flat surface is arranged for being moved relative to the positioning member for decreasing the distance between the positioning member and the flat surface.

12. Assembly according to any of the paragraphs 9-11, wherein the carrier comprises an extension element arranged between the base and the upper part, wherein the extension element is extendible such as to change a distance between the base and the upper part.

13. Assembly according to any of the paragraphs 9-12, wherein a first socket of said sockets forming the kinematic mount is shaped such as to restrain sliding of an associated first engagement element of said three engagement elements in each direction parallel to said support surface, said first engagement element further being associated with a first landing element of said three landing elements.

14. Assembly according to paragraph 9, wherein the first socket is shaped in accordance with at least one element of a group comprising: a pyramid, such as a tetrahedron, a square pyramid, a pentagonal pyramid, a hexagonal pyramid, or other polygonal pyramid, or a star pyramid; a truncated pyramid having a truncation at a bottom of the socket, such as a truncated tetrahedron, a truncated square pyramid, a truncated pentagonal pyramid, a truncated hexagonal pyramid, or other truncated polygonal pyramid, or a truncated star pyramid; a cone; or a truncated cone.

15. Assembly according to any one or more of paragraphs 9-14, wherein a second socket of said sockets forming the kinematic mount is shaped such as to restrain sliding of an associated second engagement element of said three engagement elements in one direction parallel to said support surface, said second engagement element further being associated with a second landing element of said three landing elements.

16. Assembly according to paragraph 15, wherein the second socket is a straight groove, wherein the straight groove is aligned such that its length direction points towards the first socket.

17. Assembly according to any of the paragraphs 9-16, wherein a third engagement element of said three engagement elements is arranged for being in direct contact with the support surface remote from the sockets such as to be unrestrained in directions parallel to the support surface, said third engagement element further being associated with a third landing element of said three landing elements.

18. Assembly according to any of the paragraphs 9-17, wherein one or more or each of said three engagement elements includes a compliant connection with the upper part such as to allow flexible bending of the one or more engagement element relative to the upper part, and wherein upon landing of at least one of the landing elements friction forces on the at least one landing element parallel to the flat surface are at least partially compensated by flexing of said engagement elements.

19. Assembly according to paragraph 18, wherein the compliant connection includes at least one of a group comprising: a thinned section of said one or more or each engagement element such as to allow flexing thereof relative to the upper part; and a magnetic type flexible coupling.

20. Assembly according to any of the paragraphs 9-19, wherein at least one or all of
the three engagement elements is aligned with its associated landing element in a direction transverse to the flat surface when in use the carrier rests on the flat surface.

21. Assembly according to paragraph 20 and at least one of paragraphs 13-14, wherein the first engagement element is aligned with the first landing element in a direction transverse to the flat surface when in use the carrier rests on the flat surface, and
wherein the upper part of the carrier further supports a scanning probe microscopy device including a probe having a probe tip for scanning a sample surface, wherein the probe tip is aligned with the first socket and the first landing element.

22. Carrier for use in an assembly according to any one or more of paragraphs 9-21, the carrier comprising an upper part, a base, and an extension element, wherein the extension element is arranged between the upper part and the base for moving the base to and from the upper part, wherein the carrier is arranged for receiving an positioning member between the base and the upper part of the carrier,
wherein the upper part comprises three engagement elements arranged for being in contact with a support surface of the positioning member, said support surface including a plurality of sockets forming a kinematic mount for said three engagement elements, wherein the base comprises three landing elements, each landing element being associated with a respective one of the three engagement elements,
wherein the extension element is arranged for extending such as to approach a landing position on the flat surface with the base and to continue extending the extension element until the engagement elements of the upper part are free from the kinematic mount formed by the sockets and the support surface.

23. Positioning member for use in an assembly in accordance with any of the paragraphs 9-21, wherein the positioning member is extendible for moving a carrier relative to a flat surface in a direction parallel thereto such as to position the carrier above a landing position, wherein the positioning member is arranged for being received between a base and an upper part of the carrier, said carrier further including an extension element arranged between the upper part and the base for moving the base to and from the upper part,
wherein the positioning member comprises a support surface for receiving three engagement elements of the upper part of the carrier, said support surface including a plurality of sockets forming a kinematic mount for said three engagement elements.

The invention claimed is:

1. A carrier for use in an assembly of the carrier and a positioning member with a support surface having a plurality of sockets, the carrier comprising:
an upper part, a base, and an extension element, wherein the extension element is arranged between the upper part and the base for moving the base to and from the upper part, wherein the carrier is arranged for receiving the positioning member between the base and the upper part of the carrier,
wherein the upper part comprises three engagement elements arranged for being in contact with the support surface of the positioning member the three engagement elements being kinematically mountable in the plurality of sockets forming a kinematic mount therewith, wherein the base comprises three landing elements, each landing element being associated with a respective one of the three engagement elements,
wherein, for positioning of the carrier on a flat surface using the positioning member, the extension element is arranged for extending such as to approach a landing position on the flat surface with the base and to continue extending the extension element until the three engagement elements of the upper part are free from the kinematic mount formed by the plurality of sockets and the support surface.

2. A carrier according to claim 1, wherein the plurality of sockets of the kinematic mount comprise a first socket and a second socket, wherein the first socket is shaped such as to restrain sliding of an associated first engagement element of said three engagement elements in each direction parallel to the support surface, wherein the second socket is shaped such as to restrain sliding of an associated second engagement element of said three engagement elements in one direction parallel to the support surface, and wherein a third engagement element is arranged to rest onto the support surface unrestrained in a direction parallel to the support surface, wherein each one of said first, second and third engagement element is respectively associated with a first, second and third landing element of said three landing elements; and
wherein the carrier is placeable on the flat surface, by holding the carrier oriented under an angle with the flat surface such that consecutively the first landing element lands first, the second landing element lands second, and the third landing element lands last on the flat surface.

3. A carrier according to claim 2, wherein the first socket is shaped in accordance with at least one element of a group comprising: a pyramid, such as a tetrahedron, a square pyramid, a pentagonal pyramid, a hexagonal pyramid, or other polygonal pyramid, or a star pyramid; a truncated pyramid having a truncation at a bottom of the first socket, such as a truncated tetrahedron, a truncated square pyramid, a truncated pentagonal pyramid, a truncated hexagonal pyramid, or other truncated polygonal pyramid, or a truncated star pyramid; a cone; or a truncated cone; or wherein the second socket is a straight groove, wherein the straight groove is aligned such that its length direction points towards the first socket.

4. A carrier according to claim 2, wherein the first engagement element is aligned with the first landing element in a direction transverse to the flat surface when in use the carrier rests on the flat surface, and wherein the upper part of the carrier is configured to support a scanning probe microscopy device including a probe having a probe tip for scanning a sample surface, wherein the probe tip is aligned with the first socket and the first landing element.

5. A carrier according to claim 1, wherein at least one of said three engagement elements includes a compliant connection with the upper part such as to allow flexible bending of the at least one of said three engagement elements relative to the upper part, and wherein upon landing of at least one of the landing elements friction forces on the at least one landing element parallel to the flat surface are at least partially compensated by flexing of said at least one of said three engagement elements.

6. A carrier according to claim 5, wherein the compliant connection comprises at least one of a group comprising: a thinned section of said one or more or each engagement element such as to allow flexing thereof relative to the upper part; and a coupling comprising a ball magnet cooperating with an associate magnet arranged in a holder structure for forming a flexible coupling.

7. A carrier according to claim 1, wherein at least one or all of the three engagement elements is aligned with said associated landing element in a direction transverse to the flat surface when in use the carrier rests on the flat surface.

* * * * *